United States Patent
Bonduelle et al.

(10) Patent No.: US 9,925,533 B2
(45) Date of Patent: Mar. 27, 2018

(54) METHOD OF PREPARING A CATALYST USABLE IN HYDROCONVERSION COMPRISING AT LEAST ONE ZEOLITE NU-86

(71) Applicant: IFP ENERGIES NOUVELLES, Rueil-Malmaison (FR)

(72) Inventors: Audrey Bonduelle, Francheville (FR); Emmanuelle Guillon, Vourles (FR); Magalie Roy-Auberger, Nivolas-Vermelle (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 863 days.

(21) Appl. No.: 14/366,292

(22) PCT Filed: Nov. 23, 2012

(86) PCT No.: PCT/FR2012/000482
§ 371 (c)(1),
(2) Date: Jun. 18, 2014

(87) PCT Pub. No.: WO2013/093226
PCT Pub. Date: Jun. 27, 2013

(65) Prior Publication Data
US 2014/0326641 A1    Nov. 6, 2014

(30) Foreign Application Priority Data
Dec. 22, 2011   (FR) ..................................... 11 04023

(51) Int. Cl.
*B01J 37/02*    (2006.01)
*B01J 29/78*    (2006.01)
(Continued)

(52) U.S. Cl.
CPC ........... *B01J 37/0236* (2013.01); *B01J 29/76* (2013.01); *B01J 29/78* (2013.01); *B01J 31/0201* (2013.01);
(Continued)

(58) Field of Classification Search
CPC .... B01J 2229/20; B01J 2229/42; B01J 29/76; B01J 29/78; B01J 35/002; B01J 37/0201;
(Continued)

(56) References Cited

U.S. PATENT DOCUMENTS 6,123,831 A     9/2000 Benazzi et al.
6,290,841 B1 *  9/2001 Gabrielov ................ B01J 23/75
                                                      208/213
(Continued)

FOREIGN PATENT DOCUMENTS

FR    2775202 A1    8/1999
FR    2779072 A1    12/1999

OTHER PUBLICATIONS

International Search Report from PCT/FR2012/000482 dated Apr. 29, 2013.

*Primary Examiner* — Renee Robinson
*Assistant Examiner* — Derek N Mueller
(74) *Attorney, Agent, or Firm* — Millen White Zelano & Branigan, PC (57) ABSTRACT

The invention relates to a method of preparing a catalyst comprising a) preparation of a support comprising 0.2 to 30 wt % of zeolite NU-86 and from 70 to 99.8 wt % of a porous mineral matrix, the percentages by weight being expressed relative to the total weight of said support, b) impregnation of the support prepared according to step a) with at least one solution containing at least one precursor of at least one metal selected from group VIII metals and group VIB metals, used alone or as a mixture, c) at least one ripening
(Continued)

step, and d) at least one drying step carried out at a temperature below 150° C., without a subsequent calcining step. The present invention also relates to a process for hydrocracking hydrocarbon feeds using the catalyst prepared according to the method of preparation according to the invention.

27 Claims, 1 Drawing Sheet

(51) Int. Cl.
*B01J 31/02* (2006.01)
*B01J 29/76* (2006.01)
*C10G 47/20* (2006.01)
*B01J 35/00* (2006.01)
*C10G 65/10* (2006.01)
*C10G 47/18* (2006.01)

(52) U.S. Cl.
CPC ......... *B01J 35/002* (2013.01); *B01J 37/0201* (2013.01); *C10G 47/18* (2013.01); *C10G 47/20* (2013.01); *C10G 65/10* (2013.01); *B01J 2229/20* (2013.01); *B01J 2229/42* (2013.01)

(58) Field of Classification Search
CPC ....... B01J 37/0236; B01J 37/20; C10G 47/18; C10G 47/20; C10G 65/10
See application file for complete search history.

(56) References Cited

U.S. PATENT DOCUMENTS

| | | | |
|---|---|---|---|
| 2008/0020926 A1* | 1/2008 | Guillaume | B01J 23/002 502/314 |
| 2010/0167915 A1* | 7/2010 | Mohajeri | B01J 21/185 502/159 |

* cited by examiner

METHOD OF PREPARING A CATALYST USABLE IN HYDROCONVERSION COMPRISING AT LEAST ONE ZEOLITE NU-86

The invention relates to a method of preparing a catalyst comprising at least one metal selected from the group formed by group VIII metals and group VIB metals, used alone or as a mixture, and a support comprising 0.2 to 30 wt % of zeolite NU-86 and from 70 to 99.8 wt % of a porous mineral matrix, the percentages by weight being expressed relative to the total weight of said support. The present invention also relates to a hydrocracking process using the catalyst prepared according to the specific method of preparation according to the invention.

PRIOR ART

The hydrocracking of heavy petroleum cuts is a very important refining process which makes it possible to produce, from surplus heavy feedstocks that are not easily marketable, lighter fractions such as gasolines, jet fuels and diesel fuel that the refiner requires for adapting his output to the structure of the demand. This process is described extensively in the literature.

Hydrocracking is a process that derives its flexibility from three main elements, namely the operating conditions used, the types of catalysts used and the fact that the hydrocracking of hydrocarbon feeds can be performed in one or two steps.

The hydrocracking catalysts used in the hydrocracking processes are all of the bifunctional type combining an acid function with a hydrogenating function. The acid function is supplied by acidic supports whose surface areas generally vary from 150 to 800 $m^2/g^{-1}$ such as halogenated aluminas (notably chlorinated or fluorinated), combinations of oxides of boron and of aluminium, and more often amorphous silica-aluminas and zeolites in combination with a binder, which is generally aluminic. The hydrogenating function is supplied either by one or more metals of group VIB of the periodic table, or by a combination of at least one metal of group VIB of the periodic table and at least one group VIII metal deposited on the support.

The bifunctionality of the catalyst, i.e. the ratio, the strength and the distance between the acid and hydrogenating functions is a key parameter known by a person skilled in the art to influence the activity and selectivity of the catalyst. A weak acid function and a strong hydrogenating function give catalysts of low activity, generally operating at high temperature (greater than or equal to 390-400° C.), and at low space velocity of feed (LHSV expressed in volume of feed to be treated per unit volume of catalyst per hour is generally less than or equal to 2), but endowed with very good selectivity for middle distillates (jet fuels and gas oils). Conversely, a strong acid function and a weak hydrogenating function give catalysts that are active, but have lower selectivities for middle distillates.

Catalysts comprising zeolites have good catalytic activity, but their selectivities for middle distillates (jet fuels and gas oils) are often inadequate.

The prior art includes many works for improving the selectivity of zeolite catalysts for middle distillates. The latter are composed of a hydrogenating phase of very variable composition (various metals), generally deposited on a support containing a zeolite, most often zeolite Y. The hydrogenating phase is active in the form of sulphide.

Patent application FR 2 775 293 also describes the use of a catalyst comprising at least one matrix and at least one zeolite NU-86 or NU-87 and at least one active phase in a process for the hydrocracking of hydrocarbon feeds. The preparation of said catalysts ends, in all cases, with a calcining step at a temperature between 250 and 600° C.

One aim of the present application is to propose a method of preparing a catalyst that makes it possible to improve the catalytic activity of said catalyst used in a process for hydroconversion of hydrocarbon feeds, while maintaining or improving the selectivity of the zeolite catalysts for middle distillates.

SUMMARY OF THE INVENTION

The present invention relates to a method of preparing a catalyst comprising at least the following successive steps:
a) at least the preparation of a support comprising 0.2 to 30 wt % of zeolite NU-86 and from 70 to 99.8 wt % of a porous mineral matrix, the percentages by weight being expressed relative to the total weight of said support,
b) at least one step of impregnation of said support prepared according to step a) with at least one solution containing at least one precursor of at least one metal selected from the group formed by group VIII metals and group VIB metals, used alone or as a mixture,
c) at least one ripening step,
d) at least one drying step carried out at a temperature below 150° C., without a subsequent calcining step.

The present invention also relates to a process for the hydrocracking of hydrocarbon feeds using the catalyst prepared according to said method of preparation according to the invention, operating, in the presence of hydrogen, at a temperature above 200° C., at a pressure above 1 MPa, at a space velocity between 0.1 and 20 h–1 and with an amount of hydrogen introduced such that the volume ratio liter of hydrogen/liter of hydrocarbon is between 80 and 5000 L/L.

DETAILED DESCRIPTION OF THE INVENTION

Figure 1:
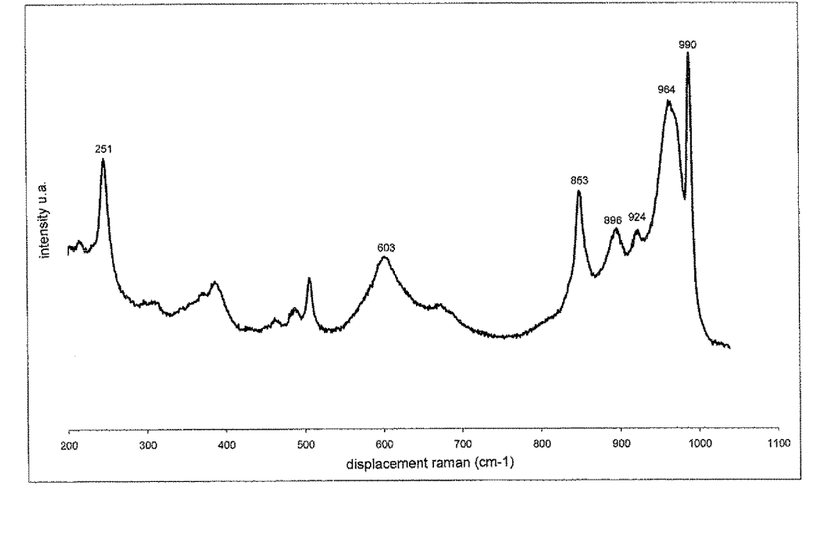
FIG. 1—Shows a line graph of intensity u.a. and displacement raman.

Step a):
According to step a) of the method of preparation according to the invention, a support is prepared comprising 0.2 to 30 wt % of zeolite NU-86 and from 70 to 99.8 wt % of a porous mineral matrix, the percentages by weight being expressed relative to the total weight of said support.

Said support prepared according to step a) of the method of preparation according to the invention preferably comprises from 0.5 to 25 wt % and preferably from 1 to 20 wt % of zeolite NU-86 and from 75 to 99.5 wt % and preferably from 80 to 99 wt % of a porous mineral matrix, the percentages by weight being expressed relative to the total weight of said support.

Zeolite NU-86 in the hydrogen form, denoted by H-NU-86 and obtained by calcining and/or ion exchange of zeolite NU-86, crude from synthesis, together with its method of preparation, is described in patent EP-0463768 A2. Said zeolite NU-86 is characterized by X-ray diffraction structural data defined by Casci et al. in patent application EP463,768.

Zeolite NU-86 is generally synthesized in the presence of sodium cations and an organic structure-forming agent, which is either octamethonium dibromide or nonamethonium dibromide.

Zeolite NU-86 contains silicon and at least one element T selected from the group formed by aluminium, iron, gallium, boron, germanium; T is preferably aluminium.

Zeolite NU-86 does not have a defined structural type, according to the rules of the IZA (International Zeolite Association).

The structural type of this zeolite has not yet been officially attributed by the synthesis committee of the IZA (International Zeolite Association). However, following the works published at the 9th International Zeolite Conference by J. L. Casci, P. A. Box and M. D. Shannon ("Proceedings of the 9th International Zeolite Conference, Montreal 1992, Eds R. Van Ballmoos et al., 1993 by Butterworth) it appears that, according to its properties:

zeolite NU-86 has a three-dimensional microporous system;

this three-dimensional microporous system consists of straight channels whose pore opening is delimited by 11 atoms T (tetrahedral atoms: Si, Al, Ga, Fe etc.), of straight channels delimited alternately by openings with 10 and 12 atoms T and of sinusoidal channels also delimited alternately by openings with 10 and 12 atoms T.

The term pore opening with 10, 11 or 12 tetrahedral atoms (T) means pores consisting of 10, 11 or 12 oxygen atoms.

Zeolite NU-86 comprised in the catalyst according to the invention is at least partially, preferably almost completely, in acid form, i.e. in the hydrogen form ($H^+$), the sodium content preferably being such that the atomic ratio Na/T is less than 10%, preferably less than 5%, even more preferably less than 1%.

Zeolite NU-86 used according to the invention has a molar ratio Si/T below 150, preferably below 100, preferably below 50, very preferably below 35, more preferably below 20, and even more preferably below 15.

The ratio Si/Al can be obtained during synthesis, without a subsequent modifying treatment. It can also be obtained by techniques of dealuminization known by a person skilled in the art such as for example a steam treatment, i.e. a thermal treatment under steam and/or an acid treatment. Patent application EP 0,939,673 describes methods for dealuminization of zeolite NU-86.

Preferably, the NU-86 used in the invention does not undergo a dealuminization step, before being formed within the support of the catalyst according to the present invention.

The porous mineral matrix included in the composition of the support of the catalyst prepared according to the invention advantageously comprises at least aluminium and/or at least silicon.

Preferably, said matrix comprises at least one aluminium oxide or at least one silicon oxide. Said matrix can advantageously be acidic or not. Said matrix can advantageously be mesostructured or not.

Said porous mineral matrix can advantageously be selected from transition aluminas, doped aluminas, preferably with phosphorus, with boron and/or with fluorine, silicalite and silicas, aluminosilicates, preferably amorphous or poorly crystallized, non-zeolitic crystalline molecular sieves such as silicoaluminophosphates, aluminophosphates, ferrosilicates, titanium silicoaluminates, borosilicates, chromosilicates and aluminophosphates of transition metals, alone or as a mixture.

In the case where said porous mineral matrix is selected from transition aluminas, silicalite and silicas, such as for example mesoporous silicas, said matrix is not acidic. Transition alumina means for example an α-alumina, a δ-alumina, a γ-alumina or a mixture of alumina of these various phases.

In the case where said porous mineral matrix is selected from aluminosilicates, preferably amorphous or poorly crystallized, non-zeolitic crystalline molecular sieves such as silicoaluminophosphates, aluminophosphates, ferrosilicates, titanium silicoaluminates, borosilicates, chromosilicates and aluminophosphates of transition metals, doped aluminas, preferably with phosphorus, with boron and/or with fluorine, said matrix is acidic. Any silica-alumina known by a person skilled in the art or any aluminosilicate known by a person skilled in the art is suitable for the invention.

The acidic porous mineral matrix can also advantageously contain, in addition to at least one of the oxide compounds mentioned above, at least one synthetic or natural simple clay of the dioctahedral 2:1 phyllosilicate or trioctahedral 3:1 phyllosilicate type such as kaolinite, antigorite, chrysotile, montmorillonite, beidellite, vermiculite, talc, hectorite, saponite, laponite. These clays can optionally be delaminated.

Said porous mineral matrix preferably has a content of cationic impurities below 0.1 wt %, preferably below 0.05 wt % and even more preferably below 0.025 wt %. Content of cationic impurities means the total content of alkaline substances. The matrix preferably has a content of anionic impurities below 1 wt %, preferably below 0.5 wt % and even more preferably below 0.1 wt %.

In the case where said porous mineral matrix comprises at least silicon, the content by weight of $SiO_2$ in said porous mineral matrix is advantageously between 1 and 99 wt %, preferably between 5 and 95 wt %, preferably between 10 and 90 wt %, more preferably between 10 and 50 wt % and even more preferably between 20 and 50 wt %.

Preferably, said porous mineral matrix is selected from alumina and silica-alumina, alone or as a mixture.

Step a) of preparation of the support of the catalyst according to the method of preparation according to the invention is advantageously carried out by any technique known by a person skilled in the art.

Zeolite NU-86 used according to the invention can advantageously have undergone treatments for stabilizing or creating mesoporosity. Zeolite NU-86 is advantageously modified by at least one of the techniques of dealuminization known by a person skilled in the art, and for example hydrothermal treatment or acid etching. Preferably, zeolite NU-86 is advantageously modified by a combination of the following three types of operations: hydrothermal treatment, ion exchange and acid etching. Said operations are known by a person skilled in the art. Said zeolite NU-86 can also advantageously undergo treatments called desilication, with basic solutions. We may mention more specifically, without being limited to this, treatments with NaOH or $Na_2CO_3$, whether or not combined with a dealuminization treatment.

Zeolite NU-86, optionally modified, used in the support can be, without this being limiting, for example in the form of powder, ground powder, suspension, suspension that has undergone a deagglomeration treatment. Thus, for example, the zeolite can advantageously be put in suspension, acidified or not, at a concentration adjusted to the final content of zeolite intended for the support. This suspension, commonly called a slurry, is then advantageously mixed with the precursors of the matrix.

Zeolite NU-86, optionally modified, is advantageously mixed with a gel, with a paste or with a suspension of oxide. Mixing is carried out so as to obtain the proportions of zeolite NU-86 and of porous mineral matrix in said support defined above. The mixture thus obtained is then formed. The forming of said support can advantageously be carried out by extrusion, by pelletizing, by the method of drop coagulation ("oil-drop"), by rotating plate granulation or by any other method that is well known by a person skilled in the art.

A preferred embodiment of step a) of the method of preparation according to the present invention consists of mixing the powder of zeolite NU-86 in a moist gel for some tens of minutes, then passing the resultant paste through a die to form extrudates with a diameter between 0.4 and 4 mm.

At least one hydrogenating-dehydrogenating metal selected from the group formed by the metals of group VIB and of group VIII of the periodic table, used alone or as a mixture, can optionally be introduced during step a) of preparation of the support and preferably during said mixing.

Moreover, to facilitate forming and/or improving the final mechanical properties of the supports, additives can advantageously be added during said mixing. As examples of additives, we may notably mention cellulose, carboxymethylcellulose, carboxyethylcellulose, tall oil, xanthan gums, surfactants, flocculating agents such as polyacrylamides, carbon black, starches, stearic acid, polyacrylic alcohol, polyvinyl alcohol, biopolymers, glucose, polyethylene glycols, etc.

Control of the characteristic porosity of the supports of the invention is partly achieved during this step of forming of the particles of supports.

The formed support is then advantageously submitted to one or more thermal treatments.

Said formed support advantageously undergoes a drying step. Said drying step is carried out by any technique known by a person skilled in the art. Preferably, drying is carried out under a stream of air. Said drying can also advantageously be carried out under a stream of any oxidizing, reducing or inert gas. Drying is advantageously carried out at reduced pressure. Preferably, drying is advantageously carried out between 50 and 180° C., preferably between 60 and 150° C. and very preferably between 80 and 130° C.

Said support, optionally dried, then preferably undergoes a calcining step.

Said calcining step is advantageously carried out in the presence of molecular oxygen, for example by flushing with air, at a temperature advantageously above 200° C. and less than or equal to 1100° C. Said calcining step can advantageously be carried out in a traversed bed, in a swept bed or in a static atmosphere. For example, the furnace used can be a rotary kiln or can be a vertical furnace with radial traversed layers. Preferably, said calcining step is carried out for between more than one hour at 200° C. and less than one hour at 1100° C. Calcining can advantageously be carried out in the presence of steam and/or in the presence of an acidic or basic vapour. For example, calcining can be performed under ammonia partial pressure.

Post-calcining treatments can optionally be carried out, so as to improve the properties of the support.

Said support can thus optionally be submitted to a hydrothermal treatment in a confined atmosphere or under a stream of steam. "Hydrothermal treatment in a confined atmosphere" means a treatment in an autoclave in the presence of water at a temperature above room temperature.

In the case where said hydrothermal treatment is carried out in a confined atmosphere, said formed support comprising the porous mineral matrix and zeolite NU-86 can be treated in various ways. Thus, said support can advantageously be impregnated with acid, prior to its passage through the autoclave, the autoclaving being performed either in the vapour phase, or in the liquid phase, and this vapour phase or liquid phase of the autoclave can be acidic or not. This impregnation, prior to autoclaving, can be acidic or not. This impregnation prior to autoclaving can be carried out dry or by immersion of said support in an acidic aqueous solution. Preferably, impregnation is carried out dry.

The autoclave is preferably a rotating basket autoclave such as that defined in patent application EP-A-0 387 109.

The temperature during autoclaving is advantageously between 100 and 250° C. for a period of time between 30 minutes and 3 hours.

Step b):

According to step b) of the method of preparation according to the invention, at least one step of impregnation of said support prepared according to step a) with at least one solution containing at least one precursor of at least one metal selected from the group formed by group VIII metals and group VIB metals, used alone or as a mixture, is carried out.

Preferably, said step b) is carried out in one impregnation step or by successive impregnations of at least one solution containing some or all of the precursors of at least one metal selected from the group formed by group VIII metals and group VIB metals, used alone or as a mixture.

Said step b) can optionally be carried out under reduced pressure.

In the case where step b) of impregnation of the method of preparation according to the invention is carried out by successive impregnations, at least one step d) of drying is advantageously applied between said impregnation steps.

The solutions used in the various steps of impregnation or of successive impregnations can optionally contain at least one precursor of a doping element selected from boron, phosphorus and silicon, and/or at least one organic compound.

The precursors of a doping element selected from boron, phosphorus and silicon, and organic compounds, can also advantageously be added to impregnating solutions not containing the precursors of at least one metal selected from the group formed by group VIII metals and group VIB metals, used alone or as a mixture.

Said organic additive can advantageously be introduced by impregnation before the impregnation of the metallic precursors, in co-impregnation with the metallic precursors or in post-impregnation after impregnation of the metallic precursors.

The organic compounds used as elements promoting the hydrogenating function are preferably selected from chelating agents, non-chelating agents, reducing agents and the additives known by a person skilled in the art. Said organic compounds are advantageously selected from mono-, di- or polyols optionally etherified, carboxylic acids, sugars, non-cyclic mono-, di- or polysaccharides such as glucose, fructose, maltose, lactose or sucrose, esters, ethers, crown ethers, cyclodextrins and compounds containing sulphur or nitrogen such as nitriloacetic acid, ethylenediaminetetraacetic acid, or diethylenetriamine, alone or as a mixture.

Said precursors of the group VIII metals and of the group VIB metals, the precursors of the doping elements and the organic compounds are advantageously introduced into the impregnating solution or solutions in an amount such that the contents of the element of group VIII, VIB, of the doping element and of the organic additives on the final catalyst are as defined below.

Preferably, said precursors of the group VIII metals and of the group VIB metals, the precursors of the doping elements and the organic compounds are advantageously introduced in the impregnating solution or solutions in an amount corresponding to:

- a molar ratio of element of group VIII to element of group VIB between 0.1 and 0.8, and preferably between 0.15 and 0.5,
- a molar ratio of doping element to element of group VIB between 0 and 1, and preferably between 0.08 and 0.5,
- a molar ratio of organic compound to element of group VIB between 0 and 5, and preferably between 0.2 and 3.

Preferably, said impregnation step(s) are carried out by the known "dry" method of impregnation that is well known by a person skilled in the art.

The precursors of elements of group VIII that can be used are well known by a person skilled in the art. The precursors of the base metal(s) of group VIII is/are advantageously selected from oxides, hydroxides, hydroxycarbonates, carbonates and nitrates. Nickel hydroxycarbonate, nickel nitrate, cobalt nitrate, nickel carbonate or nickel hydroxide, cobalt carbonate or cobalt hydroxide are preferably used.

The precursors of the group VIII noble metal(s) is/are advantageously selected from halides, for example chlorides, nitrates, acids such as chloroplatinic acid, oxychlorides such as ammoniated ruthenium oxychloride.

The precursors of elements of group VIB that can be used are well known by a person skilled in the art. For example, among the sources of molybdenum, it is possible to use oxides and hydroxides, molybdic acids and their salts in particular ammonium salts such as ammonium molybdate, ammonium heptamolybdate, phosphomolybdic acid ($H_3PMo_{12}O_{40}$) and their salts, and optionally silicomolybdic acid ($H_4SiMo_{12}O_{40}$) and the corresponding salts. The sources of molybdenum can also be any polyoxometallate of the Keggin, lacunar Keggin, substituted Keggin, Dawson, Anderson, or Strandberg type, for example. Molybdenum trioxide and heteropolyanions of the Strandberg type ($P_2Mo_5O_{23}^{6-}$), Keggin ($PMo_{12}O_{40}^{3-}$), lacunar Keggin or substituted Keggin, known by a person skilled in the art, are preferably used.

For example, among the precursors of tungsten, it is possible to use oxides and hydroxides, tungstic acids and their salts, in particular ammonium salts such as ammonium tungstate, ammonium metatungstate, phosphotungstic acid ($H_3PW_{12}O_{40}$) and salts thereof, and optionally silicotungstic acid ($H_4SiW_{12}O_{40}$) and salts thereof. The sources of tungsten can also be any polyoxometallate of the Keggin, lacunar Keggin, substituted Keggin, or Dawson type, for example. The ammonium oxides and salts are preferably used, such as ammonium metatungstate, or heteropolyanions of the Keggin, lacunar Keggin or substituted Keggin type known by a person skilled in the art.

The precursor of phosphorus can advantageously be orthophosphoric acid $H_3PO_4$, the corresponding salts and esters or the ammonium phosphates. Phosphorus can also advantageously be introduced at the same time as the group VIB element(s) in the form of heteropolyanions of the Keggin, lacunar Keggin, substituted Keggin or of the Strandberg type such as for example in the form of phosphomolybdic acid and its salts, phosphotungstic acid and its salts, during synthesis of said matrix. Phosphorus, when it is not introduced during synthesis of said matrix but in post-impregnation, can advantageously be introduced in the form of a mixture of phosphoric acid and a basic organic compound containing nitrogen such as ammonia, primary and secondary amines, cyclic amines, compounds of the pyridine family and quinolines and compounds of the pyrrole family.

There are numerous precursors of silicon that can be used. Thus, it is possible to use ethyl orthosilicate $Si(OEt)_4$, siloxanes, polysiloxanes, silicates of halides such as ammonium fluorosilicate $(NH_4)_2SiF_6$ or sodium fluorosilicate $Na_2SiF_6$. Silicomolybdic acid and its salts, silicotungstic acid and its salts can also advantageously be used. Silicon can be added for example by impregnation with ethyl silicate in solution in a water/alcohol mixture. Silicon can be added for example by impregnation with a silicon compound of the silicone type suspended in water.

The precursors of boron can advantageously be boric acid, preferably orthoboric acid $H_3BO_3$, ammonium diborate or pentaborate, boron oxide, boric esters. Boron can also be introduced at the same time as the group VIB element(s) in the form of Keggin heteropolyanions, lacunar Keggin, substituted Keggin for example in the form of boromolybdic acid and salts thereof, or borotungstic acid and salts thereof, during synthesis of said matrix. When it is not introduced during synthesis of said matrix but in post-impregnation, the boron can advantageously be introduced for example by means of a solution of boric acid in a water/alcohol mixture or in a water/ethanolamine mixture. The boron can also advantageously be introduced in the form of a mixture of boric acid, hydrogen peroxide and a basic organic compound containing nitrogen such as ammonia, primary and secondary amines, cyclic amines, compounds of the pyridine family and quinolines and compounds of the pyrrole family.

Step c):

According to step c) of the method of preparation according to the invention, at least one step of ripening of the impregnated support from step b) is carried out.

Said ripening step is advantageously performed by leaving the impregnated support from step b) in a humid atmosphere at a temperature advantageously between 10 and 80° C.

Said ripening step is advantageously performed for between 15 minutes and 48 hours.

Step d):

According to step d) of the method of preparation according to the invention, at least one drying step at a temperature below 150° C. is carried out, without a subsequent calcining step, on the impregnated and matured support obtained at the end of step c).

Preferably, said drying step is carried out at a temperature below 140° C., preferably below 145° C., very preferably below 130° C., more preferably between 100 and 145° C., and even more preferably between 100 and 130° C., without a subsequent calcining step.

In the case when the impregnation step b) of the method of preparation according to the invention is carried out by successive impregnations, at least one drying step d) is advantageously applied between said impregnation steps.

Drying makes it possible to remove the impregnation solvent without significantly altering the oxide precursors deposited on the support. Effective drying for removing most of the solvent is generally carried out at a temperature between 100 and 150° C. and preferably between 100 and 130° C. The drying temperature must not exceed 150° C. because above that, the oxide precursors deposited on the support are denatured.

At the end of step d), a dried catalyst is obtained, which is not submitted to a subsequent calcining step.

"Calcining step" means a step of thermal treatment generating partial or complete degradation of any organic molecules that may be present on the support and in which the oxide precursors deposited on the support are denatured partially or completely. A calcining step is generally carried out at a temperature above 150° C. and preferably between 250 and 600° C. The catalysts obtained at the end of the method according to the present invention are then advantageously formed as particles of various shapes and dimensions. They are generally used in the form of extrudates, either cylindrical or multilobed such as bilobed, trilobed, multilobed of straight or twisted shape, but can optionally be manufactured and used in the form of crushed powder, tablets, rings, beads, or wheels. They have a specific surface area measured by nitrogen adsorption according to the BET method (Brunauer, Emmett, Teller, J. Am. Chem. Soc., Vol. 60, 309-316 (1938)) between 50 and 600 $m^2/g$, a pore volume measured by mercury porosimetry between 0.2 and 1.5 $cm^3/g$ and a pore size distribution that can be monomodal, bimodal or polymodal.

Preferably, the catalysts obtained at the end of the method according to the present invention are in the form of spheres or extrudates. It is, however, advantageous for the catalyst to be in the form of extrudates with a diameter between 0.5 and 5 mm and more particularly between 0.7 and 2.5 mm. The shapes are cylindrical (which can be hollow or not), twisted cylindrical, multilobed (2, 3, 4 or 5 lobes for example), or rings. The trilobed shape is preferably used, but any other shape can be used.

The catalysts thus obtained, in oxide form, can optionally be brought at least partly to the metallic or sulphide form.

Preferably, prior to use, said catalyst obtained at the end of the method according to the present invention is transformed to a sulphided catalyst in order to form its active species.

A step e) of sulphurization is advantageously applied after said drying step d), on said dried catalyst obtained at the end of step d) of the method according to the invention, without an intermediate calcining step.

Said dried catalyst is advantageously sulphided ex situ or in situ. The sulphiding agents are gaseous $H_2S$ or any other sulphur-containing compound used for activating hydrocarbon feeds for the purpose of sulphiding the catalyst. Said sulphur-containing compounds are advantageously selected from alkyl disulphides, for example dimethyl disulphide (DMDS), alkyl sulphides, for example dimethyl sulphide, n-butylmercaptan, polysulphides of the tert-nonylpolysulphide type such as for example TPS-37 or TPS-54 marketed by the company ARKEMA, or any other compound known by a person skilled in the art that enables good sulphurization of the catalyst to be obtained. Preferably the catalyst is sulphided in situ in the presence of a sulphiding agent and a hydrocarbon feed. Very preferably the catalyst is sulphided in situ in the presence of a hydrocarbon feed to which dimethyl disulphide has been added.

A conventional method of sulphurization well known by a person skilled in the art consists of heating the catalyst in the presence of hydrogen sulphide (pure or for example under a stream of a hydrogen/hydrogen sulphide mixture) at a temperature between 150 and 800° C., preferably between 250 and 600° C., generally in a traversed-bed reaction zone.

The present invention also relates to the catalyst obtainable by the method of preparation according to the invention.

The catalyst obtained by the method of preparation according to the invention comprises at least one hydrogenating-dehydrogenating metal selected from the group formed by metals of group VIB and of group VIII of the periodic table, used alone or as a mixture, and a support comprising 0.2 to 30 wt %, preferably from 0.5 to 25 wt % and more preferably from 1 to 20 wt % of zeolite NU-86 and from 70 to 99.8 wt %, preferably from 75 to 99.5 wt % and more preferably from 80 to 99 wt % of a porous mineral matrix, the percentages by weight being expressed relative to the total weight of said support.

The group VIB metals and group VIII metals can be present at least partly in a form selected from metallic and/or oxide and/or sulphide.

The group VIII metals are advantageously selected from noble metals or base metals, preferably from iron, cobalt, nickel, ruthenium, rhodium, palladium, osmium, iridium and platinum alone or as a mixture, and preferably said group VIII metals are selected from nickel, cobalt and iron, platinum and palladium, used alone or as a mixture.

The group VIII base metals are preferably selected from nickel, cobalt and iron, used alone or as a mixture.

The group VIII precious metals are preferably selected from platinum and palladium, used alone or as a mixture.

The group VIB metals are preferably selected from tungsten and molybdenum, used alone or as a mixture.

Advantageously, the following combinations of metals are used: nickel-molybdenum, cobalt-molybdenum, nickel-tungsten, cobalt-tungsten, the preferred combinations being: nickel-molybdenum, cobalt-molybdenum, cobalt-tungsten, nickel-tungsten and even more advantageously nickel-molybdenum and nickel-tungsten.

Preferably, said catalyst comprises at least one hydrogenating-dehydrogenating metal of group VIB in combination with at least one group VIII base metal.

In the case where the catalyst comprises at least one group VIB metal in combination with at least one group VIII base metal, the content of group VIB metal, in oxide equivalent, is advantageously between 5 and 40 wt % relative to the total dry weight of said catalyst, preferably between 10 and 35 wt % and very preferably between 15 and 30 wt % and the content of group VIII base metal, in oxide equivalent, is advantageously between 0.5 and 10 wt % relative to the total dry weight of said catalyst, preferably between 1 and 8 wt % and very preferably between 1.5 and 6 wt %.

In the case where the catalyst comprises at least one group VIII noble metal, the content of group VIII noble metal, in oxide equivalent, is advantageously between 0.05 and 5 wt % relative to the total dry weight of said catalyst, preferably between 0.1 and 2 wt % and very preferably between 0.1 and 1 wt %.

The catalyst according to the present invention can also optionally comprise promoters of the active phase, preferably selected from doping elements and organic compounds. Said entities can advantageously be added at various steps in the preparation of the catalyst according to the invention.

The catalyst according to the present invention can also optionally comprise at least one doping element selected from boron, silicon and phosphorus, alone or as a mixture. "Doping element" means an element that is added, which in itself does not have a catalytic character, but which increases the catalytic activity of the catalyst.

Said catalyst optionally comprises a content of doping element between 0 and 10%, preferably between 0.5 and 8% and more preferably between 0.5 and 6 wt % as oxide relative to the total dry weight of said catalyst. The content of silicon doping element is not included in the total content of silicon in the zeolite or in the matrix.

Boron, silicon and/or phosphorus can be in the porous mineral matrix, or in the zeolite NU-86 or are preferably deposited on the catalyst and then are mainly localized on said porous mineral matrix.

The catalyst according to the present invention can also optionally comprise at least one organic additive. "Organic additive" means an organic molecule, which in itself does not have any catalytic character, but which increases the catalytic activity of the catalyst.

The organic compounds used as elements promoting the hydrogenating function are preferably selected from chelating agents, non-chelating agents, reducing agents and the additives known by a person skilled in the art. Said organic compounds are advantageously selected from mono-, di- or polyols optionally etherified, carboxylic acids, sugars, non-cyclic mono-, di- or polysaccharides such as glucose, fructose, maltose, lactose or sucrose, esters, ethers, crown ethers, cyclodextrins and compounds containing sulphur or nitrogen such as nitriloacetic acid, ethylenediaminetetraacetic acid, or diethylenetriamine, alone or as a mixture.

Said catalyst optionally comprises a content of organic additive between 0 and 30%, preferably between 5 and 30% and more preferably between 10 and 30 wt % relative to the total weight of said catalyst.

Hydroconversion Process

The present invention also relates to a hydroconversion process, preferably hydrocracking, of hydrocarbon feeds using a catalyst prepared according to said method of preparation according to the invention, and said hydroconversion process being carried out in the presence of hydrogen, at a temperature above 200° C., at a pressure above 1 MPa, at a space velocity between 0.1 and 20 h−1 and with an amount of hydrogen introduced such that the volume ratio liter of hydrogen/liter of hydrocarbon is between 80 and 5000 L/L.

Preferably, the hydroconversion process according to the invention is carried out at a temperature between 250 and 480° C., preferably between 320 and 450° C., very preferably between 330 and 435° C., at a pressure between 2 and 25 MPa, preferably between 3 and 20 MPa, at a space velocity between 0.1 and 6 h−1, preferably between 0.2 and 3 h−1, and with an amount of hydrogen introduced such that the volume ratio liter of hydrogen/liter of hydrocarbon is between 100 and 2000 L/L.

These operating conditions used in the process according to the invention generally make it possible to reach conversions per pass, to products having boiling points below 340° C., and preferably below 370° C., greater than 15 wt % and even more preferably between 20 and 95 wt %.

Very varied feedstocks can be treated in the process according to the invention. They advantageously contain at least 20 vol % and preferably at least 80 vol % of compounds boiling above 340° C.

The hydrocarbon feed used in the process according to the present invention is advantageously selected from LCO (Light Cycle Oil=light gas oils from a catalytic cracking unit), atmospheric distillates, vacuum distillates such as for example gas oils from direct distillation of crude or from conversion units such as FCC, coking or visbreaking units, feeds obtained from units for extraction of aromatics from lubricating oil bases or from solvent dewaxing of lubricating oil bases, distillates from fixed-bed or ebullating-bed processes for desulphurization or hydroconversion of atmospheric residues and/or of vacuum residues and/or of deasphalted oils, paraffins from the Fischer-Tropsch process, deasphalted oils, and feeds received from processes for hydrotreating and hydroconversion of biomass, used alone or as a mixture. The above list is not limiting. Said feeds preferably have a boiling point T5 above 340° C., preferably above 370° C., i.e. 95% of the compounds present in the feed have a boiling point above 340° C., and preferably above 370° C.

The nitrogen content of the feeds treated in the processes according to the invention is advantageously above 500 ppm by weight, preferably between 500 and 10000 ppm by weight, more preferably between 700 and 4000 ppm by weight and even more preferably between 1000 and 4000 ppm by weight. The sulphur content of the feeds treated in the processes according to the invention is advantageously between 0.01 and 5 wt %, preferably between 0.2 and 4 wt % and even more preferably between 0.5 and 3 wt %.

The feed can optionally contain metals. The cumulative content of nickel and vanadium in the feeds treated in the processes according to the invention is preferably below 1 ppm by weight.

The feed can optionally contain asphaltenes. The asphaltenes content is generally below 3000 ppm by weight, preferably below 1000 ppm by weight, even more preferably below 200 ppm by weight.

Advantageously, said hydrocarbon feed can optionally contain metals, in particular nickel and vanadium. The cumulative content of nickel and vanadium in said hydrocarbon feed, treated according to the hydrocracking process according to the invention, is preferably below 1 ppm by weight. The asphaltenes content of said hydrocarbon feed is generally below 3000 ppm, preferably below 1000 ppm, even more preferably below 200 ppm.

Prior to feed injection and in the case where said catalysts comprise base metals, the catalysts used in the process according to the present invention are submitted to a sulphurization treatment for transforming, at least partially, the metallic species to sulphide before bringing them in contact with the feed to be treated. This treatment of activation by sulphurization is well known by a person skilled in the art and can be carried out by any method already described in the literature, either in situ, i.e. in the reactor, or ex situ.

Guard Beds

In the case where the feed contains compounds such as resins and/or asphaltenes, it is advantageous to pass the feed beforehand over a bed of catalyst or of adsorbent different from the hydrocracking or hydrotreating catalyst. The guard catalysts or guard beds used according to the invention are in the form of spheres or extrudates. It is, however, advantageous for the catalyst to be in the form of extrudates with a diameter between 0.5 and 5 mm and more particularly between 0.7 and 2.5 mm. The shapes are cylindrical (which can be hollow or not), twisted cylindrical, multilobed (2, 3, 4 or 5 lobes for example), or rings. The cylindrical shape is preferably used, but any other shape can be used.

In order to correct the presence of impurities and/or poisons in the feed, the guard catalysts can, in another preferred embodiment, have more particular geometric shapes in order to increase their voidage. The voidage of these catalysts is between 0.2 and 0.75. Their outside diameter can vary between 1 and 35 mm. Among the particular shapes possible, without this list being limiting, we may mention: hollow cylinders, hollow rings, Raschig rings, jagged hollow cylinders, ribbed hollow cylinders, pentaring cartwheels, cylinders with multiple holes, etc.

These guard catalysts or guard beds can have been impregnated with an active phase or not. Preferably, the catalysts are impregnated with a hydrogenating-dehydrogenating phase. Very preferably, the phase CoMo or NiMo is used.

These guard catalysts or guard beds may display macroporosity. The guard beds can be those marketed by Norton-Saint-Gobain, for example the MacroTrap® guard beds. The guard beds can be those marketed by Axens in the ACT family: ACT077, ACT645, ACT961 or HMC841, HMC845, HMC868 or HMC945. It can be particularly advantageous to superpose these catalysts in at least two different beds of variable heights. The catalysts with the highest voidage are preferably used in the first catalyst bed or beds at the catalytic reactor inlet. It can also be advantageous to use at least two different reactors for these catalysts.

Embodiments

The hydroconversion process, preferably hydrocracking according to the invention employing the catalyst prepared according to the method of preparation, covers the ranges of pressure and of conversion ranging from mild hydrocracking to high-pressure hydrocracking. Mild hydrocracking means hydrocracking leading to moderate conversions, generally below 40%, and taking place at low pressure, generally between 2 MPa and 6 MPa.

The hydrocracking process according to the invention is carried out in the presence of at least one hydrocracking catalyst according to the invention. The hydrocracking process according to the invention can advantageously be performed in one or two steps, independently of the pressure at which said process is carried out. It is carried out in the presence of one or more hydrocracking catalysts obtained according to the invention, in one or more reaction units equipped with one or more reactors.

The hydrocracking process according to the invention can advantageously employ said catalyst described above alone, in one or several fixed-bed catalyst beds, in one or more reactors, in a known single-step hydrocracking scheme, with or without liquid recycling of the unconverted fraction, optionally in conjunction with a conventional hydrotreating catalyst located upstream of the catalyst prepared by the method of preparation according to the invention and used in the hydroconversion process according to the invention.

The hydrocracking process according to the invention can advantageously also employ said catalyst described above alone, in one or more ebullating bed reactors, in a known single-step hydrocracking scheme, with or without liquid recycling of the unconverted fraction, optionally in conjunction with a conventional hydrotreating catalyst located in a fixed bed or ebullating bed reactor upstream of the catalyst used in the process according to the present invention.

The ebullating bed operates with withdrawal of spent catalyst and daily addition of fresh catalyst in order to maintain stable catalyst activity.

The catalyst prepared by the method of preparation according to the invention can also advantageously be used in the first hydrotreating reaction zone, in a converting pretreatment, alone or in conjunction with another conventional hydrorefining catalyst, located upstream of the catalyst described according to the invention, in one or more catalyst beds, in one or more fixed-bed or ebullating-bed reactors.

Known Single-Step Process

The hydrocracking process according to the invention can advantageously be carried out in a known single-step process.

Known single-step hydrocracking comprises, firstly and generally, a thorough hydrorefining with the aim of carrying out thorough hydrodenitrogenation and desulphurization of the feed before the latter is sent to the hydrocracking catalyst proper, in particular in the case where the latter comprises a zeolite. This thorough hydrorefining of the feed only leads to limited conversion of the feed, to lighter fractions, which is still insufficient and must therefore be completed on the more active hydrocracking catalyst described above. However, it should be noted that there is no separation between the two types of catalysts. The whole of the effluent leaving the reactor is injected onto said hydrocracking catalyst proper and separation of the products formed is only carried out later. This version of hydrocracking, also called "once-through", includes a variant with recycling of the unconverted fraction to the reactor for more thorough conversion of the feed.

The catalyst prepared by the method of preparation according to the invention is therefore advantageously employed in a known single-step hydrocracking process, in a hydrocracking zone positioned downstream of a hydrorefining zone, no intermediate separation being applied between the two zones.

Preferably, the hydrorefining catalyst used in the first hydrorefining reaction zone, alone or in conjunction with another conventional hydrorefining catalyst, located upstream of the catalyst prepared by the method of preparation according to the invention, is a catalyst optionally comprising a doping element selected from phosphorus, boron and silicon, said catalyst being based on group VIII base elements and optionally in combination with group VIB elements on an alumina or silica-alumina support and even more preferably said catalyst comprises nickel and tungsten.

The catalyst prepared by the method of preparation according to the invention can also advantageously be used in the first hydrorefining reaction zone, in a converting pretreatment, alone or in conjunction with another conventional hydrorefining catalyst, located upstream of the catalyst described according to the invention, in one or more catalyst beds, in one or more reactors.

Known Single-Step Fixed-Bed Process with Intermediate Separation

The hydrocracking process according to the invention can advantageously be used in a known single-step fixed-bed process with intermediate separation.

Said process advantageously comprises a hydrorefining zone, a zone for partial removal of ammonia, for example by hot flash, and a zone comprising said hydrocracking catalyst according to the invention. This process for the single-step hydrocracking of hydrocarbon feeds for production of middle distillates and optionally of oil bases advantageously comprises at least one first hydrorefining reaction zone, and at least one second reaction zone, in which hydrocracking of at least a proportion of the effluent from the first reaction zone is carried out. This process also advantageously comprises incomplete separation of ammonia from the effluent leaving the first zone. This separation is advantageously carried out by means of an intermediate hot flash operation. The hydrocracking performed in the second reaction zone is advantageously carried out in the presence of ammonia in an amount less than the amount present in the feed, preferably below 1500 ppm by weight, more preferably below 1000 ppm by weight and even more preferably below 800 ppm by weight of nitrogen.

The catalyst described according to the invention is therefore advantageously employed in a known single-step fixed-bed hydrocracking process with intermediate separation, in a hydrocracking zone positioned downstream of a hydrorefining zone, an intermediate separation for partial removal of ammonia being applied between the two zones.

Preferably, the hydrorefining catalyst used in the first hydrorefining reaction zone, alone or in conjunction with another conventional hydrorefining catalyst, located upstream of the catalyst described according to the invention, is a catalyst optionally comprising a doping element selected from phosphorus, boron and silicon, said catalyst being based on group VIII base elements and optionally in combination with group VIB elements on an alumina or silica-alumina support and even more preferably said catalyst comprises nickel and tungsten.

The catalyst prepared by the method of preparation according to the invention can also advantageously be used in the first hydrorefining reaction zone, in a converting pretreatment, alone or in conjunction with another conventional hydrorefining catalyst, located upstream of the catalyst described according to the invention, in one or more catalyst beds, in one or more reactors.

Known Two-Step Process

The hydroconversion process, preferably hydrocracking according to the invention can advantageously be employed in a known two-step process.

Two-step hydrocracking comprises a first step which has the purpose, as in the "single-step" process, of performing hydrorefining of the feed, but also of achieving a conversion of the latter generally of the order of 40 to 60%. The effluent from the first step then undergoes a separation (distillation), most often called intermediate separation, which has the aim of separating the conversion products from the unconverted fraction. In the second step of a two-step hydrocracking process, only the fraction of the feed that was not converted during the first step is treated. This separation allows a two-step hydrocracking process to be more selective for middle distillates (kerosene+diesel) than a single-step process. In fact, intermediate separation of the conversion products avoids their "overcracking" to naphtha and gas in the second step on the hydrocracking catalyst. Moreover, it should be noted that the unconverted fraction of the feed treated in the second step generally has very low contents of $NH_3$ as well as of organic nitrogen compounds, generally below 20 ppm by weight or even below 10 ppm by weight.

The configurations of fixed-bed or ebullating-bed catalyst beds described in the case of a known single-step process can advantageously be used in the first step of a known two-step scheme, whether the catalyst according to the invention is used alone or in conjunction with a conventional hydrorefining catalyst.

The catalyst prepared by the method of preparation according to the invention is therefore advantageously employed in a known two-step hydrocracking process, in the second step of hydrocracking positioned downstream of the first step of hydrorefining, an intermediate separation being applied between the two zones.

For the known single-step processes and for the first step of hydrorefining of known two-step hydrocracking processes, the conventional hydrorefining catalysts that can advantageously be used are the catalysts optionally comprising a doping element selected from phosphorus, boron and silicon, said catalyst being based on group VIII base elements and optionally in combination with group VIB elements on an alumina or silica-alumina support and even more preferably said catalyst comprises nickel and tungsten.

According to a first embodiment of the hydrocracking process according to the invention, the hydrocracking catalyst(s) positioned in the hydrocracking process obtained is(are) advantageously used alone or successively, in one or more fixed-bed or ebullating-bed catalyst beds, in one or more reactors, in a known "single-step" hydrocracking scheme, with or without liquid recycling of the unconverted fraction, optionally in conjunction with a hydrorefining catalyst located upstream of the hydrocracking catalyst or catalysts. The ebullating bed operates with withdrawal of spent catalyst and daily addition of fresh catalyst in order to maintain stable catalyst activity.

According to a second embodiment of the hydrocracking process according to the invention, the hydrocracking catalyst(s) of the hydrocracking process according to the invention is(are) advantageously used alone or successively, in one or in several catalyst beds, in one and/or other step of a known "two-step" hydrocracking scheme. The "two-step" scheme is a scheme for which there is intermediate separation of the effluents between the two reaction zones. This scheme can be carried out with or without liquid recycling of the unconverted fraction from the first reaction zone or from the second reaction zone. The first reaction zone operates as fixed-bed or ebullating-bed. In the particular case where the hydrocracking catalyst or catalysts obtained according to the invention are to be used in the first reaction zone, they should preferably be used in conjunction with a hydrorefining catalyst located upstream of said catalysts.

The following examples illustrate the present invention but without limiting its scope.

Example 1: Preparation of a Support S1 Comprising a Zeolite NU-86 and a Porous Matrix of the Alumina Type One of the raw materials used is a zeolite NU-86, which is prepared according to example 2 of patent EP 0 463768 A2 and has an overall atomic ratio Si/Al equal to 11 and an atomic ratio Na/Al equal to 0.25.

Zeolite NU-86, crude from synthesis, firstly undergoes a known dry calcining at 550° C. under a stream of dry air for 9 hours. Then the solid obtained is submitted to four ion exchanges in a 10N solution of $NH_4NO_3$, at about 100° C. for 4 hours for each exchange. The solid thus obtained is designated $NH_4$-NU-86/1 and has a ratio Si/Al=11 and a ratio Na/Al=0.0012. Its other physicochemical characteristics are presented in Table 1.

TABLE 1

| Description of zeolite NU-86 | | | |
|---|---|---|---|
| | X-ray diffraction | Adsorption | |
| Sample | crystallinity (%) | $S_{BET}$ ($m^2$/g) | V(P/$P_O$ = 0.19) ml $N_2$ liquid/g |
| $NH_4$-NU-86/1 | 100 | 433 | 0.159 |

The crystallites of zeolite NU-86 are in the form of crystals ranging in size from 0.4 μm to 2 μm.

Next, 23 wt % of zeolite NU-86 is mixed with 77 wt % of a matrix composed of ultrafine tabular boehmite or alumina gel. An aqueous solution containing nitric acid at 66 wt % is added to this mixture (7 wt % of acid per gram of gel dry). This mixture is mixed for 15 minutes. The mixed paste is then extruded through a die having trilobed orifices with a diameter of 2 mm. The extrudates are then calcined at 500° C. for 2 hours in air. These extrudates constitute the support S1.

Example 2: Preparation of a Support S2 Comprising a Zeolite NU-86 and a Porous Matrix of the Silica-Alumina Type A silica-alumina powder was prepared by coprecipitation with a composition of 30% $SiO_2$ and 70% $Al_2O_3$. A hydrocracking catalyst support containing this silica-alumina and zeolite NU-86 from example 1 was then made. For this, 7.6 wt % of zeolite NU-86 from example 1 is mixed with 92.4 wt % of a matrix composed of the silica-alumina prepared above. This mixture of powder was then mixed with an aqueous solution containing nitric acid at 66% (7 wt % of acid per gram of gel dry) and then mixed for 15 minutes. After said mixing, the paste obtained is passed through a die having trilobed orifices with a diameter of 2 mm. The extrudates are then dried overnight at 120° C. and then calcined at 550° C. for 2 hours in air. The extrudates finally undergo a treatment under steam at 750° C. for 2 h. These extrudates constitute support S2.

Example 3: Preparation of a Catalyst C1 of Formulation NiMoP (According to the Invention) on Support S2

The extrudates of support S2 containing zeolite NU-86 and the silica-alumina matrix are impregnated dry with an aqueous solution, in which $Ni(OH)_2$, $MoO_3$ and $H_3PO_4$ were dissolved beforehand using a reflux apparatus. They are dried overnight at 120° C. in air and do not undergo subsequent calcining. The formulation NiMoP of catalyst C1 is 2.2-20-4.2 wt % relative to the dry weight of the catalyst for Ni (expressed in the form of NiO), for Mo (expressed in the form of $MoO_3$) and for P (expressed in the form of $P_2O_5$), respectively. The ratios are as follows: Ni/Mo=0.21 and P/Mo=0.42.

Example 4: Preparation of a Catalyst C2 of Formulation NiMoP (not According to the Invention) on Support S2

The catalyst C2 corresponds to catalyst C1 calcined at 450° C.

Example 5: Preparation of a Catalyst C3 of Formulation NiMoP (According to the Invention) on Support S1

The support extrudates containing zeolite NU-86 and alumina are impregnated dry with an aqueous solution in which $Ni(OH)_2$, $MoO_3$ and $H_3PO_4$ were dissolved beforehand using a reflux apparatus. They are dried overnight at 120° C. in air and do not undergo subsequent calcining. The formulation NiMoP of catalyst C3 is 2.6-23.2-4.7 wt % relative to the dry weight of the catalyst for Ni (expressed in the form of NiO), for Mo (expressed in the form of $MoO_3$) and for P (expressed in the form of $P_2O_5$), respectively. The ratios are as follows: Ni/Mo=0.22 and P/Mo=0.41.

Example 6: Preparation of a Catalyst C4 of Formulation NiMoP (not According to the Invention) on Support S1

The catalyst C4 corresponds to catalyst C3 calcined at 450° C.

Example 7: Evaluation of Catalysts C1 and C2 in High-Pressure Hydrocracking of a Vacuum Distillate The catalysts C1 and C2 whose preparation is described in examples 3 and 4 are used for hydrocracking a partially hydrotreated vacuum distillate, the main characteristics of which are shown in Table 2.

TABLE 2

| Characteristics of the partially hydrotreated vacuum distillate | |
| --- | --- |
| Density at 15° C. | 0.9051 |
| Sulphur (wt %) | 0.24 |
| Nitrogen (ppm by weight) | 301 |

The catalysts C1 and C2 were used according to the process of the invention using a pilot unit comprising 1 traversed fixed bed reactor, with the fluids circulating from top to bottom (down-flow).

Prior to the hydrocracking test, the catalysts are sulphided at 14 MPa, at 350° C. by means of a direct-distillation gas oil to which 2 wt % of DMDS (dimethyl disulphide) has been added.

After sulphurization, catalytic tests were carried out in the following conditions:
Total pressure: 14 MPa,
Hydrogen flow rate: 1000 liters of gaseous hydrogen per liter of feed injected, Space velocity (LHSV) is equal to 0.66 $h^{-1}$, The temperature applied is that for which 80% of crude conversion is obtained.

DMDS and aniline are added to the feed in order to maintain, during the test, the $H_2S$ and $NH_3$ partial pressures that would have been generated by previous hydrotreating of the non-hydrotreated crude feed.

The catalytic performance is expressed in terms of crude conversion of the 370+ cut (molecules whose boiling point is above 370° C.) to the 370− cut (molecules whose boiling point is below 370° C.) and crude selectivity for middle distillates (150-370° C. cut). The conversion and the selectivity are expressed on the basis of the results of simulated distillation and of the analyses of the gases by gas chromatography.

The crude conversion to products having a boiling point below 370° C., denoted by CB 370° C., is taken as equal to the percentage by weight of molecules whose boiling point is below 370° C. in the effluents CB 370° C.=% of $370°\ C.^-_{effluents}$ The crude selectivity for middle distillates (cut whose boiling points are between 150 and 370° C.) is denoted by SB MD and is taken as equal to:

SB MD=[(fraction in 150-370$_{effluents}$)]/[(% of 370° $C.^-_{effluents}$)].

The catalytic performance obtained is shown in Table 3 below.

TABLE 3

| Catalytic results of catalysts C1 and C2 in high-pressure hydrocracking | | | |
| --- | --- | --- | --- |
| Catalyst | Thermal treatment of the oxide phase NiMoP | Temperature to maintain CB 370° C. = 80% | SB MD in % |
| C1 (according to the invention) | Drying at 120° C. without calcining | 393° C. | 64 |
| C2 (not according to the invention) | Drying at 120° C. and calcining at 450° C. | 395° C. | 64 |

The results show that drying the oxide phase precursor of the hydrogenating function at 120° C. makes it possible to generate a catalyst C1 (prepared according to the invention) that is more active than catalyst C2 (not according to the invention) for which the oxide phase was calcined at 450°

C., while maintaining the same selectivity for middle distillates.

Example 8: Evaluation of Catalysts C3 and C4 in High-Pressure Hydrocracking of a Vacuum Distillate The catalysts C3 and C4 whose preparation is described in examples 5 and 6 are used for hydrocracking a hydrotreated vacuum distillate, the main characteristics of which are shown in Table 4.

TABLE 4

| Characteristics of the hydrotreated vacuum distillate | |
|---|---|
| Density at 15° C. | 0.8659 |
| Sulphur (ppm by weight) | 54 |
| Nitrogen (ppm by weight) | 14 |

The catalysts C3 and C4 were used according to the process of the invention using a pilot unit comprising 1 traversed fixed bed reactor, with the fluids circulating from top to bottom (down-flow).

Prior to the hydrocracking test, the catalysts are sulphided at 14 MPa, at 350° C. by means of a direct-distillation gas oil with 2 wt % of DMDS (dimethyl disulphide) added.

After sulphurization, catalytic tests were carried out in the following conditions:
Total pressure: 14 MPa,
Hydrogen flow rate: 1000 liters of gaseous hydrogen per liter of feed injected,
Space velocity (LHSV) is equal to $1\ h^{-1}$,
The temperature applied is that for which 70% of crude conversion is obtained.

DMDS and aniline are added to the feed in order to maintain, during the test, the $H_2S$ and $NH_3$ partial pressures that would have been generated by previous hydrotreating of the non-hydrotreated crude feed.

The catalytic performance is expressed in terms of crude conversion of the 370+ cut (molecules whose boiling point is above 370° C.) to the 370− cut (molecules whose boiling point is below 370° C.) and of the yield of middle distillates (MD, 150-370° C. cut). The conversion and the yield of MD are expressed on the basis of the results of simulated distillation and analyses of the gases by gas chromatography.

The crude conversion to products having a boiling point below 370° C., denoted by CB 370° C., is taken as equal to the percentage by weight of molecules whose boiling point is below 370° C. in the effluents CB 370° C.=% of 370° C.$^-_{effluents}$ The yield of middle distillates (cut whose boiling points are between 150 and 370° C.) is taken as equal to:
Yield of MD=% of molecules whose boiling points are between 150° C. and 370° C. in the effluents.

The catalytic performance obtained is shown in Table 5 below.

TABLE 5

Catalytic results for C3 and C4 in high-pressure hydrocracking

| Catalyst | Composition of the support | Temperature for maintaining CB 370° C. = 80% | Yield of MD in % |
|---|---|---|---|
| C3 (according to the invention) | Drying at 120° C. without subsequent calcining | 365.5 | 49.8 |
| C4 (not according to the invention) | Drying at 120° C. and calcining at 450° C. | 367.5 | 49.7 |

The results show that drying the oxide phase precursor of the hydrogenating function at 120° C. makes it possible to generate a catalyst C3 (prepared according to the method of preparation of the invention) that is more active than catalyst C4 (not according to the invention), for which the oxide phase was calcined at 450° C., while maintaining the same yield of middle distillates.

The invention claimed is:

1. A method of preparing a hydrocracking catalyst, said method comprising:
   a) preparing a support comprising 0.2 to 30 wt % of zeolite NU-86 and from 70 to 99.8 wt % of a porous mineral matrix, the percentages by weight being expressed relative to the total weight of said support,
   b) impregnating said support according to a) with at least one solution containing at least one precursor of at least one metal selected from the group VIII metals and group VI B metals, used alone or as a mixture,
   c) ripening the impregnated support according to b), and
   d) drying the ripened impregnated support according to c) at a temperature below 150 C, without a subsequent calcining step, to obtain a hydrocracking catalyst,
   wherein said catalyst comprises at least one organic compound and said organic compound is selected from mono-, di- or polyols optionally etherified, carboxylic acids, sugars, non-cyclic mono-, di- or polysaccharides, esters, ethers, crown ethers, cyclodextrins, nitriloacetic acid, ethylenediaminetetraacetic acid, or diethylenetriamine, alone or as a mixture, and wherein said solution contains least one precursor of a doping element selected from boron, phosphorus and silicon, and/or at least said organic compound.

2. The method according to claim 1, wherein said porous mineral matrix is selected from transition aluminas, doped aluminas, silicalite, silicas, aluminosilicates, and non-zeolitic crystalline molecular sieves, alone or as a mixture.

3. The method according to claim 1, wherein said porous mineral matrix is selected from alumina and silica-alumina, alone or as a mixture.

4. The method according to claim 1, wherein b) is carried out by successive impregnations with a drying step performed between each of said impregnations.

5. The method according to claim 1 wherein said solution contains:
   a molar ratio of group VIII element to group VIB element between 0.1 and 0.8,
   a molar ratio of a doping element, selected from boron, phosphorus and silicon, to group VIB element between 0 and 1, and
   a molar ratio of said organic compound to group VIB element of less than 5.

6. The method according to claim 1, wherein said ripening is carried out by leaving the impregnated support from b) in the presence of water vapor at a temperature between 10 and 80° C.

7. The method according to claim 1, wherein said drying is carried out at a temperature below 130° C., without a subsequent calcining step.

8. The method according to claim 1, further comprising performing a sulphurization e) after the drying in d), without an intermediate calcining step.

9. A process for hydroconversion of hydrocarbon feeds using the catalyst prepared by the method according to claim 1, said process comprising
performing hydrocracking in the presence of said catalyst and hydrogen at a temperature above 200° C., at a pressure above 1 MPa, at a space velocity between 0.1 and 20 h−1 and with an amount of hydrogen introduced such that the volume ratio liter of hydrogen/liter of hydrocarbon is between 80 and 5000 L/L.

10. The process according to claim 9, wherein said process is carried out at a temperature between 250 and 480° C., at a pressure between 2 and 25 MPa, at a space velocity between 0.1 and 6 h−1, and with an amount of hydrogen introduced such that the volume ratio liter of hydrogen/liter of hydrocarbon is between 100 and 2000 L/L.

11. The process according to claim 9, wherein said hydrocarbon feed is selected from light gas oils received from a catalytic cracking unit, atmospheric distillates, vacuum distillates, feeds received from units for extraction of aromatics from lubricating oil bases or from solvent dewaxing of lubricating oil bases, distillates from processes for fixed-bed or ebullating-bed desulphurization or hydroconversion of atmospheric residues and/or of vacuum residues and/or of deasphalted oils, paraffins from the Fischer-Tropsch process, deasphalted oils, and feeds received from processes for hydrotreating and hydroconversion of biomass, used alone or as a mixture.

12. The process according to claim 9, wherein said process is implemented in a single-step process.

13. The process according to claim 9, wherein said process is implemented in a two-step process.

14. The method according to claim 1, wherein said support comprises 1 to 20 wt % of zeolite NU-86 and from 80 to 99 wt % of said porous mineral matrix.

15. The method according to claim 1, wherein said zeolite NU-86 contains silicon and at least one element T selected from by aluminum, iron, gallium, boron, and germanium, and has a molar ratio Si/T below 100.

16. The method according to claim 1, wherein said solution contains:
a molar ratio of group VIII element to group VIB element between 0.15 and 0.5,
a molar ratio of a doping element, selected from boron, phosphorus and silicon, to group VIB element between 0.08 and 0.5, and
a molar ratio of an organic compound to group VIB element between 0.2 and 3.

17. The method according to claim 1, wherein the precursors of metals of group VIII are selected from oxides, hydroxides, hydroxycarbonates, carbonates and nitrates.

18. The method according to claim 1, wherein the precursors of metals of group VIII are selected from nickel hydroxycarbonate, nickel nitrate, cobalt nitrate, nickel carbonate, nickel hydroxide, cobalt carbonate and cobalt hydroxide.

19. The method according to claim 1, wherein the precursors of metals of group VIII noble metals are selected from halides, nitrates, acids, and oxychlorides.

20. The method according to claim 1, wherein the precursors of metals of group VIB are selected from molybdenum oxides, molybdenum hydroxides, molybdic acids and salts thereof, phosphomolybdic acid and salts thereof, and silicomolybdic acid and salts thereof.

21. The method according to claim 1, wherein the precursors of elements of group VIB are selected from molybdenum Strandberg ($P_2Mo_5O_{23}^{6-}$) heteropolyanions, molybdenum Keggin ($PMo_{12}O_{40}^{3-}$) heteropolyanions, molybdenum lacunar Keggin heteropolyanions, and molybdenum substituted Keggin heteropolyanions.

22. The method according to claim 1, wherein said catalyst comprises at least one group VIB metal in combination with at least one group VIII metal, and the content of group VIB metal, in oxide equivalent, is between 5 and 40 wt % relative to the total dry weight of said catalyst, and the content of group VIII metal, in oxide equivalent, is between 0.5 and 10 wt % relative to the total dry weight of said catalyst.

23. The method according to claim 1, wherein said catalyst has a doping element content of between 0.5 and 8% wt % as oxide relative to the total dry weight of said catalyst.

24. The method according to claim 1, wherein said catalyst has an organic additive content of between 5 and 30 wt % relative to the total weight of said catalyst.

25. The method according to claim 1, wherein said at least one solution does not contain a molybdenum heteropolyanion.

26. The method according to claim 1, wherein said at least one solution does not contain an Anderson polyoxometallate.

27. The method according to claim 1, wherein said at least one solution contains a precursor of nickel as a precursor of a group VIII metal, a precursor of molybdenum as a precursor of a group VIB metal, and a precursor of phosphorus as a precursor of a doping element.

* * * * *